(12) United States Patent
Masuyama

(10) Patent No.: US 9,154,685 B2
(45) Date of Patent: Oct. 6, 2015

(54) DRIVING TECHNOLOGY OF AN IMAGE SENSOR IN AN IMAGE CAPTURE APPARATUS

(71) Applicant: CANON KABUSHIKI KAISHA, Tokyo (JP)

(72) Inventor: Kimihiro Masuyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/010,966

(22) Filed: Aug. 27, 2013

(65) Prior Publication Data

US 2014/0063329 A1 Mar. 6, 2014

(30) Foreign Application Priority Data

Sep. 3, 2012 (JP) ................................ 2012-193571

(51) Int. Cl.
*G03B 13/00* (2006.01)
*H04N 5/232* (2006.01)

(52) U.S. Cl.
CPC ....... *H04N 5/23212* (2013.01); *H04N 5/23241* (2013.01)

(58) Field of Classification Search
CPC ........................ H04N 5/23212; H04N 5/23241

USPC .................................................. 348/345, 349
See application file for complete search history.

(56) References Cited

U.S. PATENT DOCUMENTS

2002/0080260 A1 6/2002 Ojima
2009/0135294 A1 5/2009 Hirai et al.

FOREIGN PATENT DOCUMENTS

JP 2001-083407 A 3/2001

OTHER PUBLICATIONS

The above references were cited in a European Search Report issued on Dec. 4, 2013, which is enclosed, that issued in the corresponding European Patent Application No. 13182278.5.

*Primary Examiner* — Antoinette Spinks
(74) *Attorney, Agent, or Firm* — Cowan, Liebowitz & Latman, P.C.

(57) ABSTRACT

An image capture apparatus includes an image sensor having a pixel that photo-electrically converts an object image, a readout unit that reads out a signal for image forming and a signal for focus detection from the pixel, and a control unit that controls which one of a first readout mode to read out both the signal for focus detection and the signal for image forming from the pixel and a second readout mode to read out only the signal for image forming from the pixel is to be used to operate the readout unit.

16 Claims, 11 Drawing Sheets

DRIVING TECHNOLOGY OF AN IMAGE SENSOR IN AN IMAGE CAPTURE APPARATUS

BACKGROUND OF THE INVENTION

1. Field of the Invention

The present invention relates to a driving technology of an image sensor in an image capture apparatus.

2. Description of the Related Art

Recent image capture apparatuses such as digital video cameras and digital still cameras can record a moving image having a high resolution and high frame rate for a long time because of the improvement of the sensitivity of the image sensor, employment of advanced image processing, and an increase in the memory capacity.

Conventionally, a digital video camera or a digital still camera widely uses a contrast detection method as a method of detecting focus using an image sensor. In the contrast detection method, the sharpness of an object image formed by an image capture optical system is obtained by evaluating the output of a solid-state image sensor using a predetermined function, and the position of the image capture optical system on the optical axis is adjusted such that the function value takes an extreme value. To calculate the extreme value, the in-focus position needs to be passed once. For this reason, quite a long time is required until the in-focus state is obtained in principle.

On the other hand, there is known a technique of, in the image sensor, dividing a photodiode (to be referred to as a PD hereinafter) that exists in one pixel and receives light condensed by one microlens, thereby performing focus detection of a phase difference detection method on the image sensor plane. For example, in Japanese Patent Laid-Open No. 2001-83407, the PD in one pixel is divided into two PDs, thereby obtaining an output image (to be referred to as an AF image hereinafter) by a light beam from part of the exit pupil and an output image (to be referred to as a main image hereinafter) by a light beam from the entire exit pupil. Hence, the main image can be received while performing AF of the phase difference detection method using the AF image.

In the focus detection of the phase difference detection method, the defocus amount can be obtained. Hence, the time until in-focus can greatly be shortened as compared to the contract detection method.

In the technique described in Japanese Patent Laid-Open No. 2001-83407, however, if the AF image and the main image are received for each frame at the time of moving image recording or the like, the amount of data to process per unit time increases, and the power consumption increases. Since the calculation amount increases not only in the image sensor but also in the processing circuits connected to the subsequent stages, the amount of heat generated by the entire image capture apparatus increases. The image capture enable time shortens on account of image quality degradation due to heat generation and a need for device protection.

In addition, when the power consumption increases, the time until image capture prohibition shortens as the battery level decreases. This is particularly problematic when capturing a moving image at a high frame rate.

SUMMARY OF THE INVENTION

The present invention has been made in consideration of the above-described problems, and provides an image capture apparatus capable of prolonging the time until image capture prohibition while suppressing degradation in AF performance when recording a moving image.

The present invention in a first aspect of the present invention provides an image capture apparatus comprising: an image sensor having a pixel unit which photo-electrically converts an object image; a readout unit configured to read out a signal for image forming and a signal for focus detection from the pixel unit; and a control unit configured to control which one of a first readout mode comprising reading out both the signal for focus detection and the signal for image forming from the pixel unit and a second readout mode comprising reading out only the signal for image forming from the pixel unit is to be used to operate the readout unit.

The present invention in a second aspect of the present invention provides a method of an image capture apparatus, the apparatus comprising: an image sensor including a pixel unit which photo-electrically converts an object image; a readout unit configured to read out a signal for image forming and a signal for focus detection from the pixel unit; and a control unit; the method comprising: the control unit controlling which one of a first readout mode comprising reading out both the signal for focus detection and the signal for image forming from the pixel unit and a second readout mode comprising reading out only the signal for image forming from the pixel unit is to be used to operate the readout unit.

The present invention in a third aspect provides a storage medium storing a program to cause a computer to perform a method of an image capture apparatus, the apparatus comprising: an image sensor including a pixel unit which photo-electrically converts an object image; a readout unit configured to read out a signal for image forming and a signal for focus detection from the pixel unit; and a control unit; the method comprising: the control unit controlling which one of a first readout mode comprising reading out both the signal for focus detection and the signal for image forming from the pixel unit and a second readout mode comprising reading out only the signal for image forming from the pixel unit is to be used to operate the readout unit.

Further features of the present invention will become apparent from the following description of exemplary embodiments with reference to the attached drawings.

DESCRIPTION OF THE EMBODIMENTS

Figure 1:
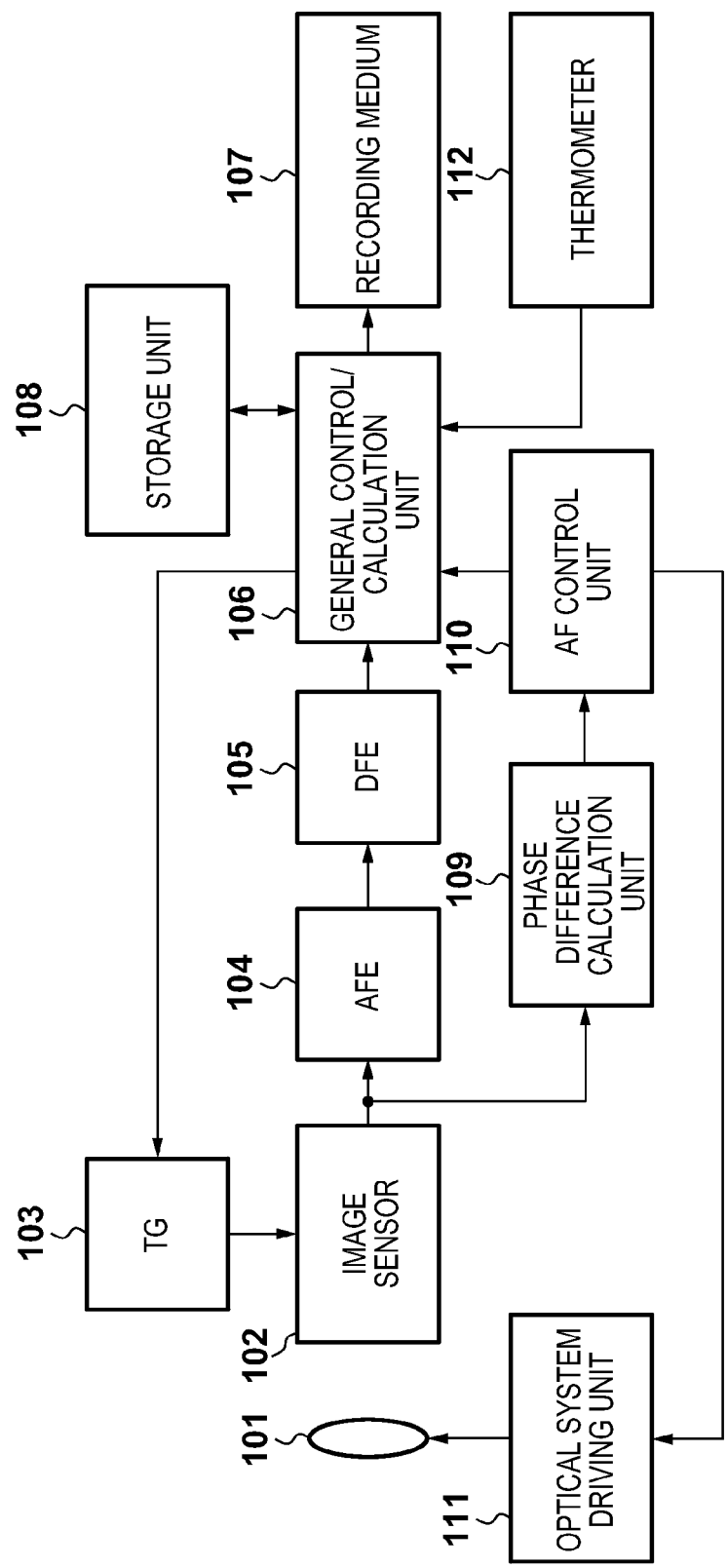
FIG. 1 is a block diagram showing the schematic arrangement of an image capture apparatus according to the first embodiment of the present invention.

The embodiments of the present invention will now be described in detail with reference to the accompanying drawings. Note that the same reference numerals denote the same element components throughout the drawings used in the following explanation.

First Embodiment

FIG. 1 is a block diagram showing the schematic arrangement of an image capture apparatus according to the first embodiment of the present invention. Referring to FIG. 1, an optical system 101 includes a focus lens, and also includes a zoom lens and a stop. An image sensor 102 photo-electrically converts an object image formed by the optical system 101. The image sensor 102 can output an image signal obtained by dividing the pupil of each pixel. A timing generator (to be referred to as a TG hereinafter) 103 controls the timing of accumulation and readout of the image sensor 102.

An analog front end (to be referred to as an AFE hereinafter) 104 performs reference level adjustment (clamp processing) and analog/digital conversion. A digital front end (to be referred to as a DFE hereinafter) 105 receives the digital output of each pixel and digitally performs image signal correction, pixel rearrangement, and the like. A general control/calculation unit 106 performs image processing such as color conversion, white balance correction, and gamma correction, resolution conversion processing, image compression processing, and the like for an image signal obtained from the DFE 105, and outputs the processed image signal to a recording medium 107 or a display device (not shown). A storage unit 108 is used as the work memory of the general control/calculation unit 106 or a buffer memory for continuous shooting or the like.

A phase difference calculation unit 109 calculates, from the pupil-divided image signal output from the image sensor 102, a phase difference evaluation value used for focus adjustment of the phase difference detection method. An AF control unit 110 calculates optical system driving information such as a defocus amount used to control the focus lens position of the optical system 101 based on the phase difference evaluation value calculated by the phase difference calculation unit 109. An optical system driving unit 111 controls the optical system 101. The information calculated by the AF control unit 110 is sent to the general control/calculation unit 106 as well and used to decide parameters for control of the TG 103. That is, the phase difference calculation unit 109, the AF control unit 110, and the optical system driving unit 111 perform focus adjustment control of the known phase difference detection method.

A thermometer (temperature detection unit) 112 monitors the temperature in the image capture apparatus. The general control/calculation unit 106 displays an alarm about image degradation or the like on the display device (not shown) or forcibly ends image capturing based on the temperature output from the thermometer 112.

Figure 2:
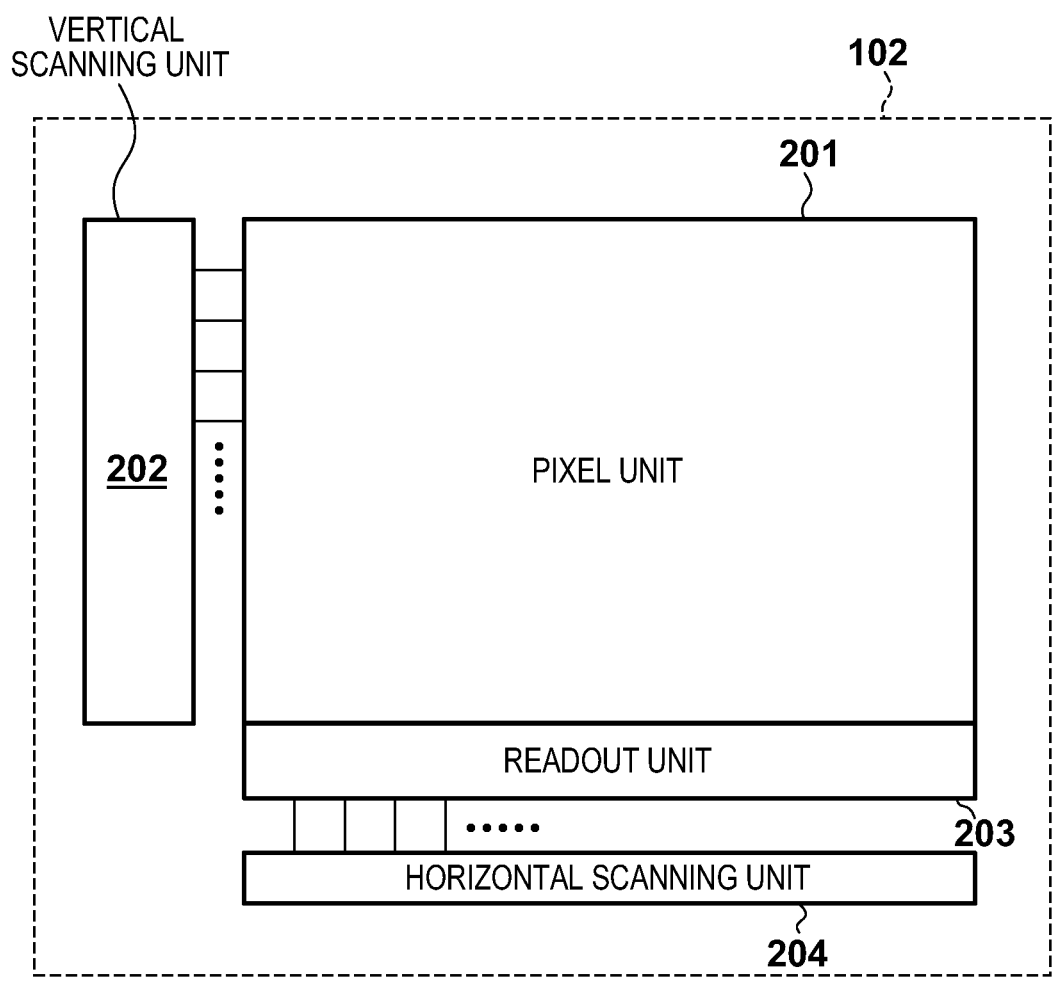
FIG. 2 is a view schematically showing the arrangement of an image sensor.

FIG. 2 is a view schematically showing the arrangement of the image sensor 102 in the image capture apparatus according to this embodiment.

As shown in FIG. 2, the image sensor 102 includes a pixel unit 201, a vertical scanning unit 202, a readout unit 203, and a horizontal scanning unit 204. The pixel unit 201 includes pixels capable of outputting pupil-divided image signals and arranged in a matrix, and receives an optical image formed by the optical system 101. The vertical scanning unit 202 sequentially selects one of a plurality of rows of the pixel unit 201, and the horizontal scanning unit 204 sequentially selects one of a plurality of columns of the pixel unit 201 so as to sequentially select the plurality of pixels of the pixel unit 201. The readout unit 203 reads out the signal of each pixel selected by the vertical scanning unit 202 and the horizontal scanning unit 204, and outputs the readout signal to the AFE 104 or the phase difference calculation unit 109. The readout unit 203 may include an A/D conversion circuit for each column.

Figure 3A:
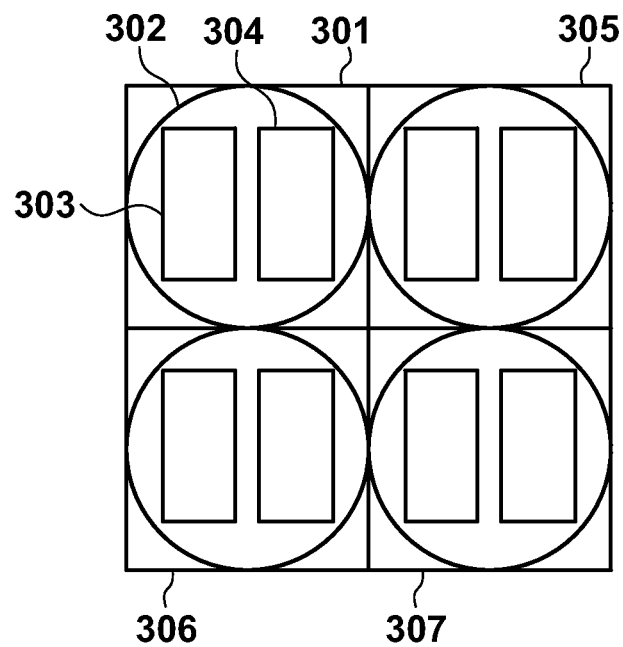
FIGS. 3A and 3B are views schematically showing the arrangement of a pixel of the image sensor.
Figure 3B:
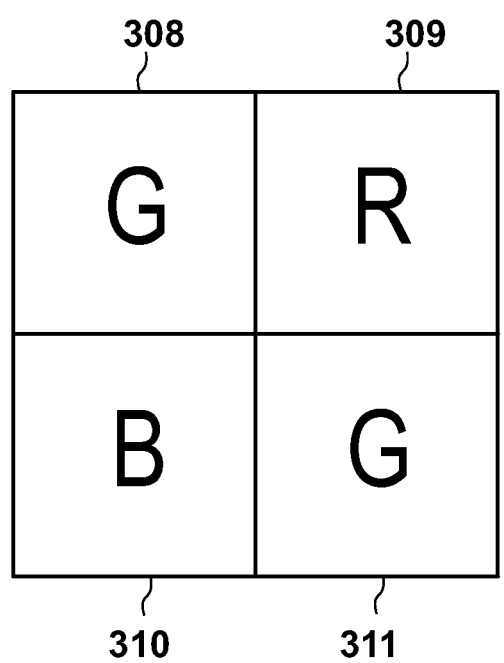

FIGS. 3A and 3B are views schematically showing the arrangement of a pixel of the pixel unit 201. Referring to FIG. 3A, each of reference numerals 301, 305, 306, and 307 denotes one pixel. Only four pixels are illustrated for the descriptive convenience. In actuality, a plurality of such pixel arrays are arranged to constitute the pixel unit 201. The pixel arrangement will be explained with a focus on the pixel 301.

The pixel 301 in the pixel unit 201 includes a microlens 302 and PDs 303 and 304. As shown in FIG. 3B, the pixels 301, 305, 306, and 307 include color filters 308, 309, 310, and 311, respectively.

Each of the PDs 303 and 304 functions as a photo-electric conversion unit that receives light formed into an image by the optical system 101 and entering the pixel 301, generates signal charges corresponding to the received light amount, and accumulates the signal charges. The image sensor 102 outputs the signal of the plurality of pixels to the AFE 104 or the phase difference calculation unit 109. The PD in one pixel is divided into two PDs so that the PDs can receive light of different pupil planes of the optical system 101. The signals of the two PDs are compared, thereby performing focus detection of the optical system 101.

Note that in this embodiment, a pixel signal read out from the signal charges of the left PD (for example, the PD 303 of the pixel 301) of the pixel divided into two parts, as shown in FIG. 3A, will be referred to as an A signal, and a pixel signal read out from the signal charges of the right PD (for example, the PD 304 of the pixel 301) will be referred to as a B signal. A pixel signal read out from the signal charges of both the left and right PDs (for example, the PDs 303 and 304 of the pixel 301) will be referred to as an A+B signal.

The pixel 301 includes the two PDs 303 and 304. In the present invention, any number of PDs are usable as long as the number is 2 or more. For example, four PDs arranged in a 2×2 matrix or nine PDs arranged in a 3×3 matrix may be used. The two PDs are aligned in the horizontal direction. However, the alignment method is not limited to this. For example, the two PDs may be aligned in the vertical direction. The pixel unit 201 may include pixels in which PDs are aligned in different ways. For example, pixels including PDs aligned in the vertical direction and pixels including PDs arranged in the horizontal direction may mix. The pixels 301 can freely be aligned in the pixel unit 201 as long as they exhibit their functions.

The pixel 301 also includes transfer switches, a floating diffusion (to be referred to as an FD hereinafter), an output unit, a selection switch, and a reset switch (none are shown). However, the constituent elements of the pixel 301 can be arranged at appropriate positions as long as they exhibit their functions.

Each pixel includes a red (R), green (G), or blue (B) color filter. Light that has entered each pixel undergoes color separation by the color filter. In this embodiment, as an example of color filters arranged in the Bayer pattern, the color filters 308 and 311 are formed from G filters, the color filter 309 is formed from an R filter, and the color filter 310 is formed from a B filter.

Figure 4:
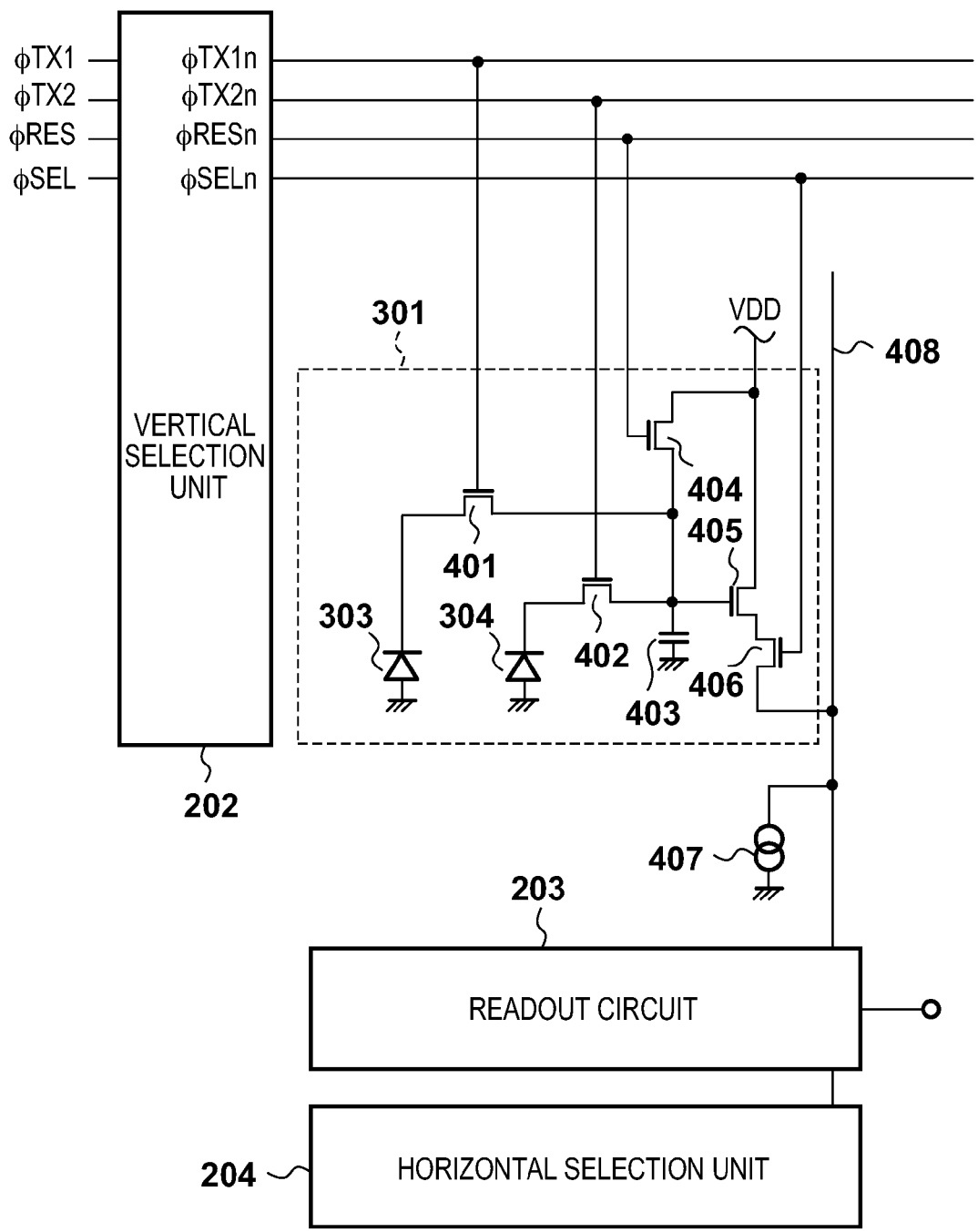
FIG. 4 is an equivalent circuit diagram of a pixel.

FIG. 4 is an equivalent circuit diagram showing the arrangement of the pixel 301. Although FIG. 4 illustrates only one pixel 301, the remaining pixels included in the pixel unit 201 also have the same arrangement. The same reference numerals as in FIG. 3 denote the components having the same functions in FIG. 4, and a detailed description thereof will be omitted.

As shown in FIG. 4, the PDs 303 and 304 of the pixel 301 are connected to transfer switches 401 and 402, respectively. The transfer switches 401 and 402 are driven by transfer pulse signals φTX1 and φTX2, respectively, to transfer signal charges generated and accumulated by the PDs 303 and 304 to an FD 403. A reset switch 404 is driven by a reset pulse signal φRES to reset the signal charges of the FD 403 by a reset potential VDD. The FD 403 functions as a charge/voltage conversion unit that holds the charges transferred from the PD 303 or 304 and converts the held charges into a voltage signal. An output unit 405 amplifies the voltage signal based on the charges held by the FD 403 and outputs the signal as a pixel signal. A source follower circuit using a MOS transistor and a constant current source 407 is illustrated here as an example. A selection switch 406 is driven by a vertical selection pulse signal φSEL to output the pixel signal amplified by the output unit 405 to a vertical output line 408. The pixel signal output to the vertical output line 408 is read out by the readout unit 203 and output to the circuit of the subsequent stage.

In the image capture apparatus according to this embodiment, the transfer pulse signals φTX1 and φTX2, the reset pulse signal φRES, and the vertical selection pulse signal φSEL input to the image sensor 102 are sequentially input to the plurality of pixels 301 of each row via the vertical selection unit 202. In FIG. 4, the signals input to the pixels 301 of an nth row via the vertical selection unit 202 are represented by φTX1n, φTX2n, φRESn, and φSELn.

In this embodiment, each switch is formed from a MOS transistor. A description will be made assuming that each switch is turned on by applying a voltage of H level to the gate of the MOS transistor and turned off by applying a voltage of L level to it.

A readout driving method using the above-described image capture apparatus will be described next in detail with reference to FIGS. 5 to 9.

Figure 5:
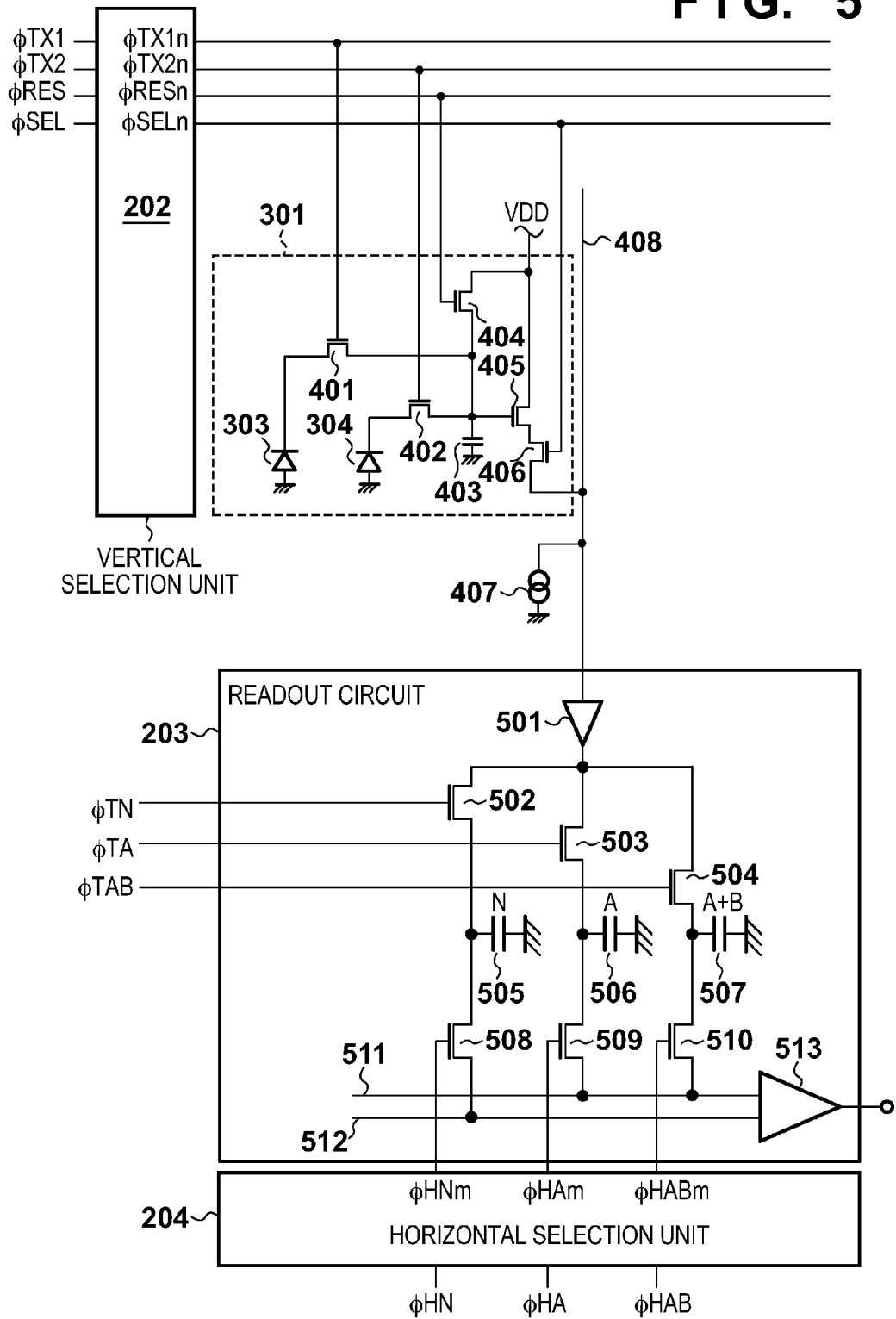
FIG. 5 is an equivalent circuit diagram of a pixel and a readout unit.

An example of the arrangement of the readout unit 203 that implements the readout driving method of this embodiment will be described with reference to FIG. 5.

A gain amplifier 501 amplifies the signal output to the vertical output line 408 and outputs the signal to the circuit of the subsequent stage. Reference numerals 502 to 504 denote readout switches; and 505 to 507, signal holding units.

The readout switch 502 is driven by a readout pulse signal φTN to cause the signal holding unit 505 to sample the reset noise signal of a pixel output to the vertical output line 408 of each column. The readout switch 503 is driven by a readout pulse signal φTA to cause the signal holding unit 506 to sample the A signal (signal for focus detection) output to the vertical output line 408 of each column. The readout switch 504 is driven by a readout pulse signal φTAB to cause the signal holding unit 507 to sample the A+B signal (signal for image forming) output to the vertical output line 408.

Reference numerals 508 to 510 denote horizontal transfer switches. The horizontal transfer switch 508 is driven by a horizontal transfer pulse signal φHN to transfer the signal charges held by the signal holding unit 505 to a horizontal signal line 512. The horizontal transfer switch 509 is driven by a horizontal transfer pulse signal φHA to transfer the signal charges held by the signal holding unit 506 to a horizontal signal line 511. The horizontal transfer switch 510 is driven by a horizontal transfer pulse signal φHAB to transfer the signal charges held by the signal holding unit 507 to the horizontal signal line 511.

In the image capture apparatus according to this embodiment, the horizontal transfer pulse signals φHA, φHN, and φHAB input to the image sensor 102 are sequentially input to the horizontal transfer switches of each column via the horizontal selection unit 204. The signals input to the horizontal transfer switches 508, 509, and 510 of an mth column via the horizontal selection unit 204 are represented by φHNm, φHAm, and φHABm. A main amplifier 513 amplifies the potential difference between the horizontal signal lines 511 and 512 and outputs the signal to the AFE 104 of the subsequent stage.

Figure 6:
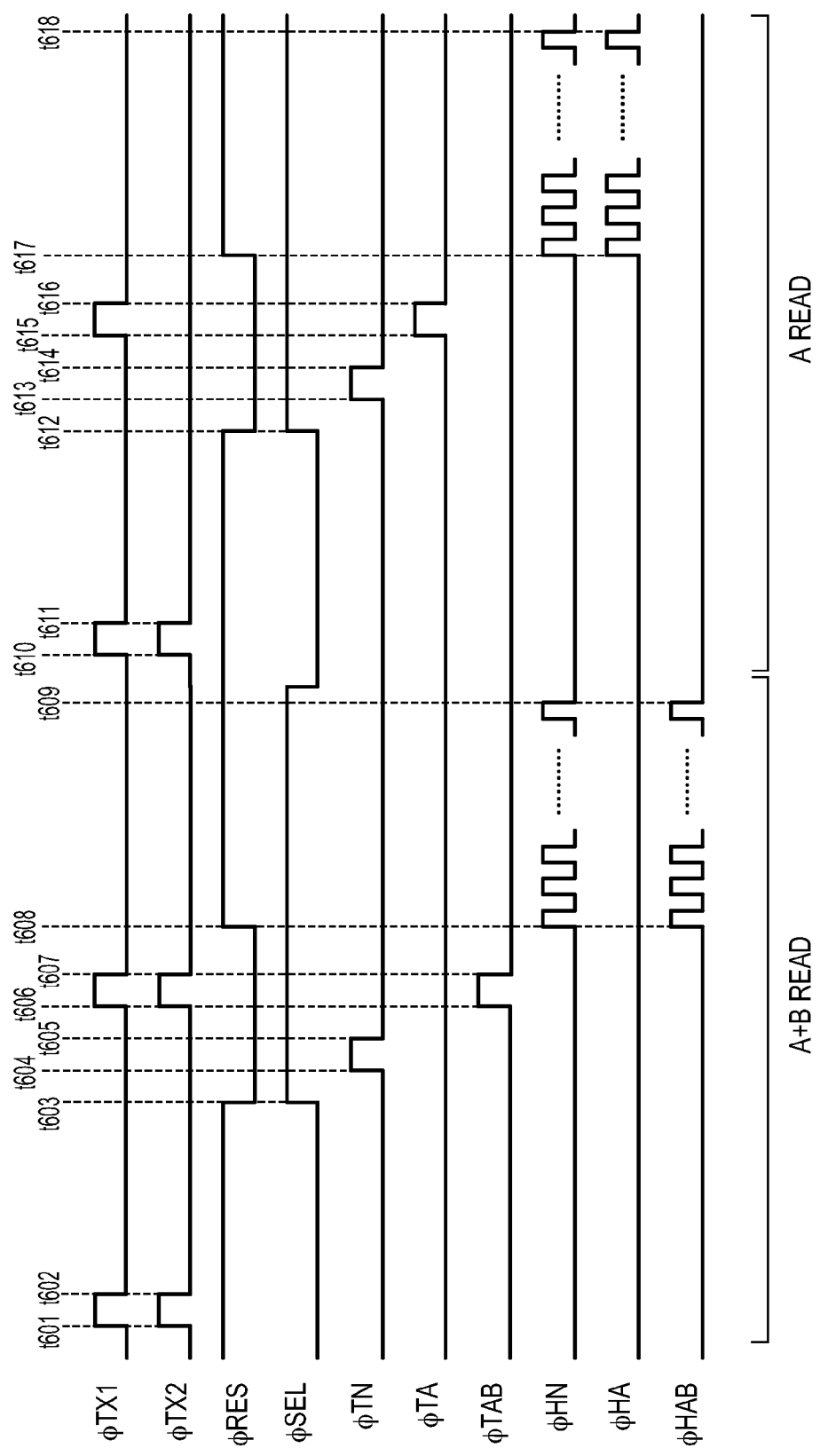
FIG. 6 is a timing chart of image signal readout driving.

The readout driving method at the time of moving image capturing in the arrangement described with reference to FIG. 5 will be explained next with reference to the timing chart of FIG. 6.

A period of t601 to t602 is a reset period. In the reset period, the transfer pulse signals φTX1 and φTX2 and the reset pulse signal RES change to H level, and the PDs and FDs of one row are reset by the voltage VDD.

A period of t602 to t607 is an accumulation period. In the accumulation period, light that has entered the PDs of each pixel is photo-electrically converted, and signal charges are accumulated in the PDs.

A period of t603 to t609 is a readout period of the signals of the nth row. In the readout period, the selection pulse signal φSEL changes to H level, and the selection switches 406 of each row are turned on by the vertical scanning unit 202. In addition, the reset pulse signal φRES is at L level during this period.

A period of t604 to t605 is an N read period. In the N read period, the reset potential of the FD 403 before transfer of the signal charges accumulated in the PDs is transferred to the signal holding unit 505 of the readout unit 203.

A period of t606 to t607 is an AB read period. In the AB read period, the signal charges of both PDs of each pixel are transferred to the signal holding unit of the readout unit 203 by the transfer pulse signals φTX1 and φTX2 and the readout pulse signal φTAB.

A period of t608 to t609 is a horizontal transfer period. In the horizontal transfer period, the signals held by the signal holding units 505 and 507 are transferred to the horizontal signal lines 512 and 511 by the horizontal transfer pulse signals φHN and φHAB, respectively. The difference signal between the signals transferred to the horizontal signal lines 511 and 512 is amplified by the main amplifier 513 and output to the AFE 104 and the phase difference calculation unit 109 of the subsequent stage. With the above-described operation, image data of the nth row out of the main image data is obtained.

Subsequently, AF image data is acquired during a period of t610 to t618. A period of t610 to t614 is the same as the period of t601 to t605. A period of t615 to t616 is an A read period. In the A read period, the signal charges of the left one of the two PDs, that is, the A signal is transferred to the signal holding unit 506 of the readout unit 203 by the transfer pulse signal φTX1 and the readout pulse signal φTA.

In a period of t617 to t618, the signals held by the signal holding units 505 and 506 are transferred to the horizontal signal lines 512 and 511 by the horizontal transfer pulse signals φHN and φHA, respectively. The difference signal between the signals transferred to the horizontal signal lines 511 and 512 is amplified by the main amplifier 513 and output to the phase difference calculation unit 109. With the above-described operation, AF image data corresponding to the nth row out of the main image data is obtained.

When the period of t601 to t618 is repeated for a necessary number of rows, the main image data and AF image data of one frame of the moving image can be obtained (first readout mode). When only the period of t601 to t609 is repeated for a necessary number of rows, the main image data of one frame can be obtained (second readout mode).

The period of t601 to t609 will be referred to as A+B read, and the period of t610 to t618 as A read. In addition, a frame to acquire main image data and AF image data will be referred to as an AF frame, and a frame to acquire only main image data as an image only frame.

Figure 7:
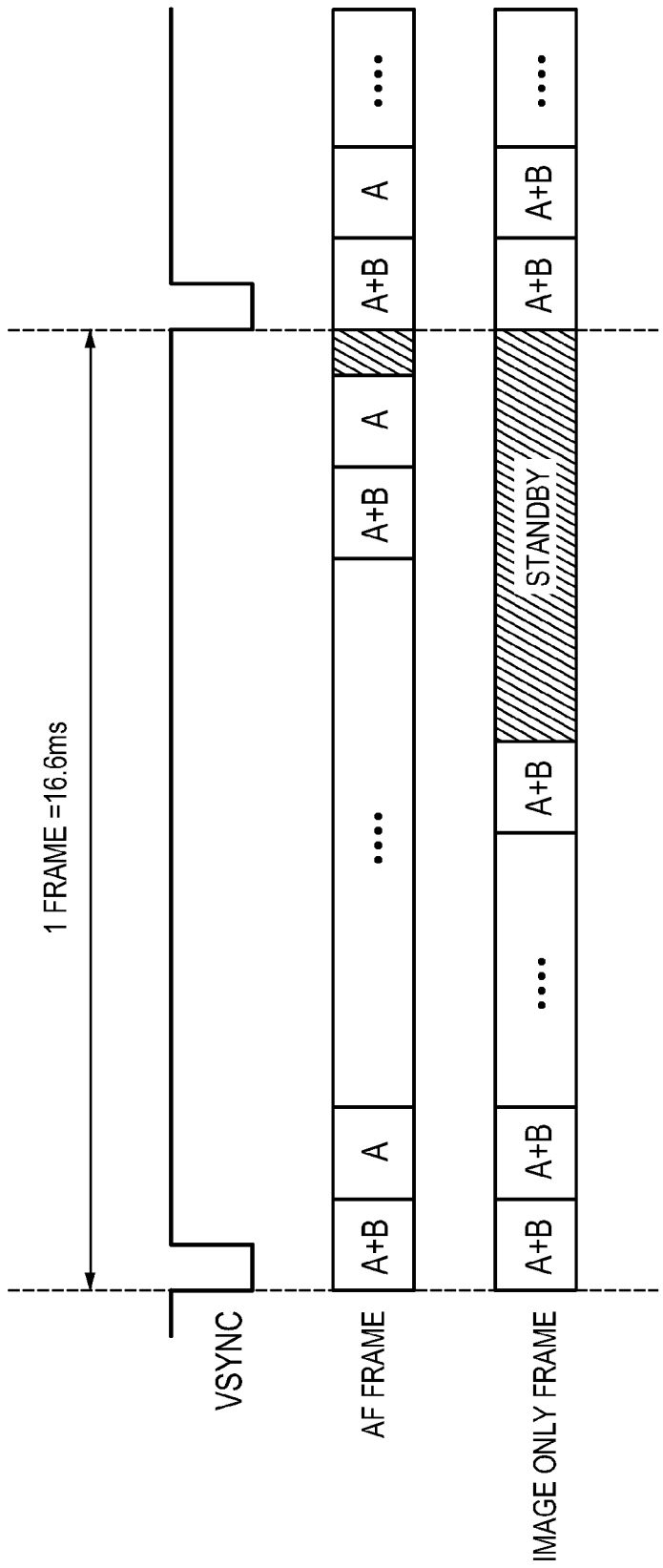
FIG. 7 is a timing chart of readout driving during moving image capturing.

FIG. 7 is a timing chart for explaining the difference between the AF frame and the image only frame in a moving image frame.

VSYNC is a vertical synchronization signal whose period is determined by the frame rate of the moving image recording format. The period when recording a moving image of 60 fps is set to, for example, 16.6 ms.

In the AF frame, the phase difference calculation unit 109 subtracts AF image data (A signal) from main image data (A+B signal) obtained from the image sensor 102 to obtain AF image data (B signal) as a counterpart, and performs predetermined phase difference calculation.

In the image only frame, only A+B read is repeated. For this reason, the readout ends in a time almost ½ that of the AF frame in which A+B read and A read are repetitively performed. When the readout is completed, the image capturing operation need not be performed until the next VSYNC. Hence, the image sensor 102, the AFE 104, and the DFE 105 are set in a minimum necessary operation state. This state is called standby.

The image only frame can take a longer standby time as compared to the AF frame. It is therefore possible to reduce the power consumption per frame.

Figure 8:
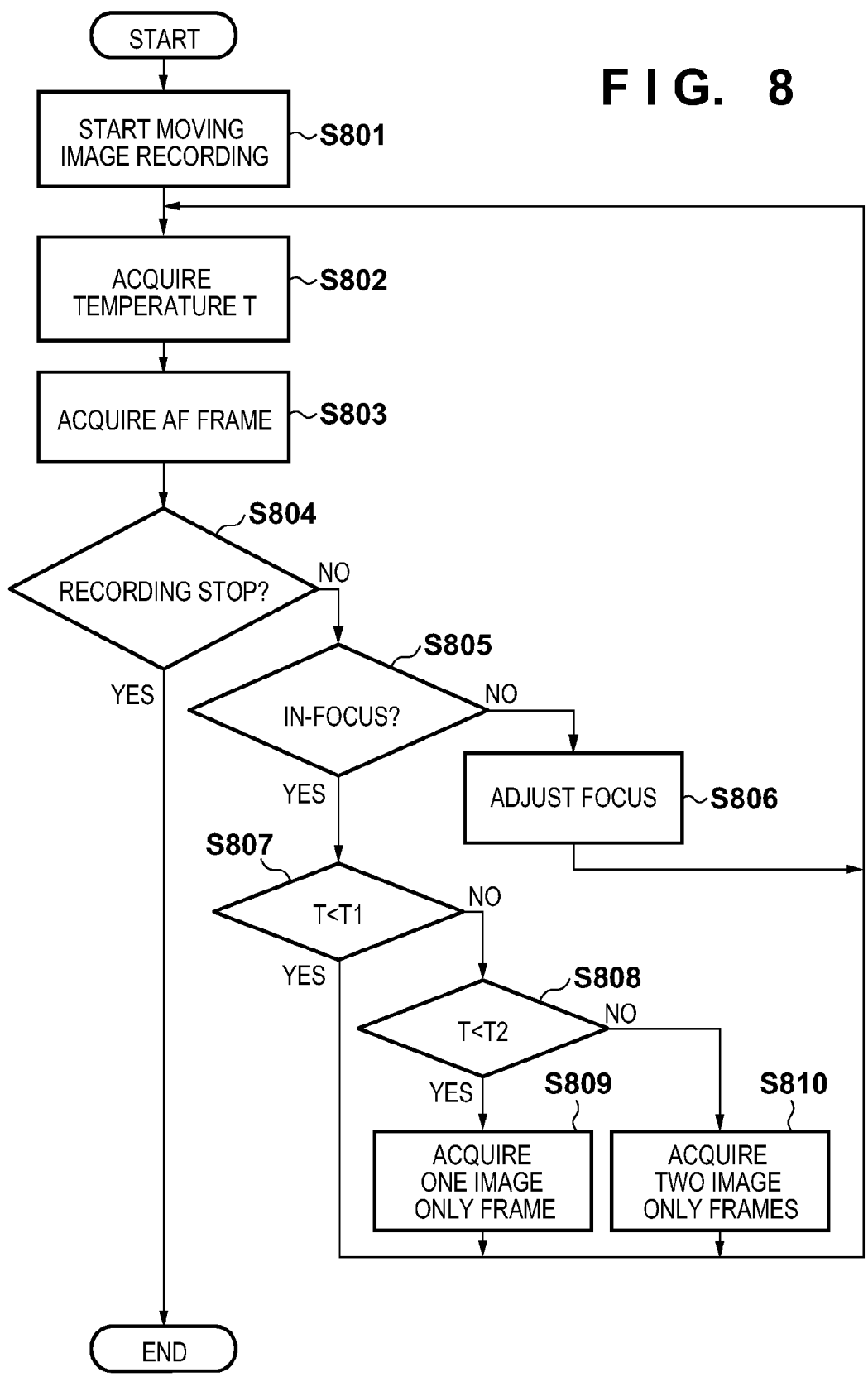
FIG. 8 is a flowchart showing an operation according to the first embodiment.

FIG. 8 is a flowchart for explaining the image capturing operation according to this embodiment.

When the user presses a recording start button (not shown), moving image recording starts in step S801. In step S802, the thermometer 112 acquires a temperature T. In step S803, an AF frame is acquired. When the user presses a recording stop button (not shown) in step S804, moving image recording ends.

If the recording stop button is not pressed in step S804, the process advances to step S805. The phase difference calculation unit 109 performs phase difference calculation based on the AF frame acquired in step S803 and determines whether an in-focus state is obtained. Upon determining in step S805 that an in-focus state is not obtained, the process advances to step S806 to drive the optical system driving unit 111 to perform focus adjustment. The process returns to step S802 to acquire the temperature T again.

Upon determining in step S805 that an in-focus state is obtained, the process advances to step S807. If T<T1, the process returns to step S802. If T≥T1, the process advances to step S808. If T<T2 in step S808, the process advances to step S809 to acquire one image only frame. If T≥T2, the process advances to step S810 to acquire two image only frames. The process then returns to step S802. That is, the number of image only frames is changed depending on the temperature.

Figure 9:
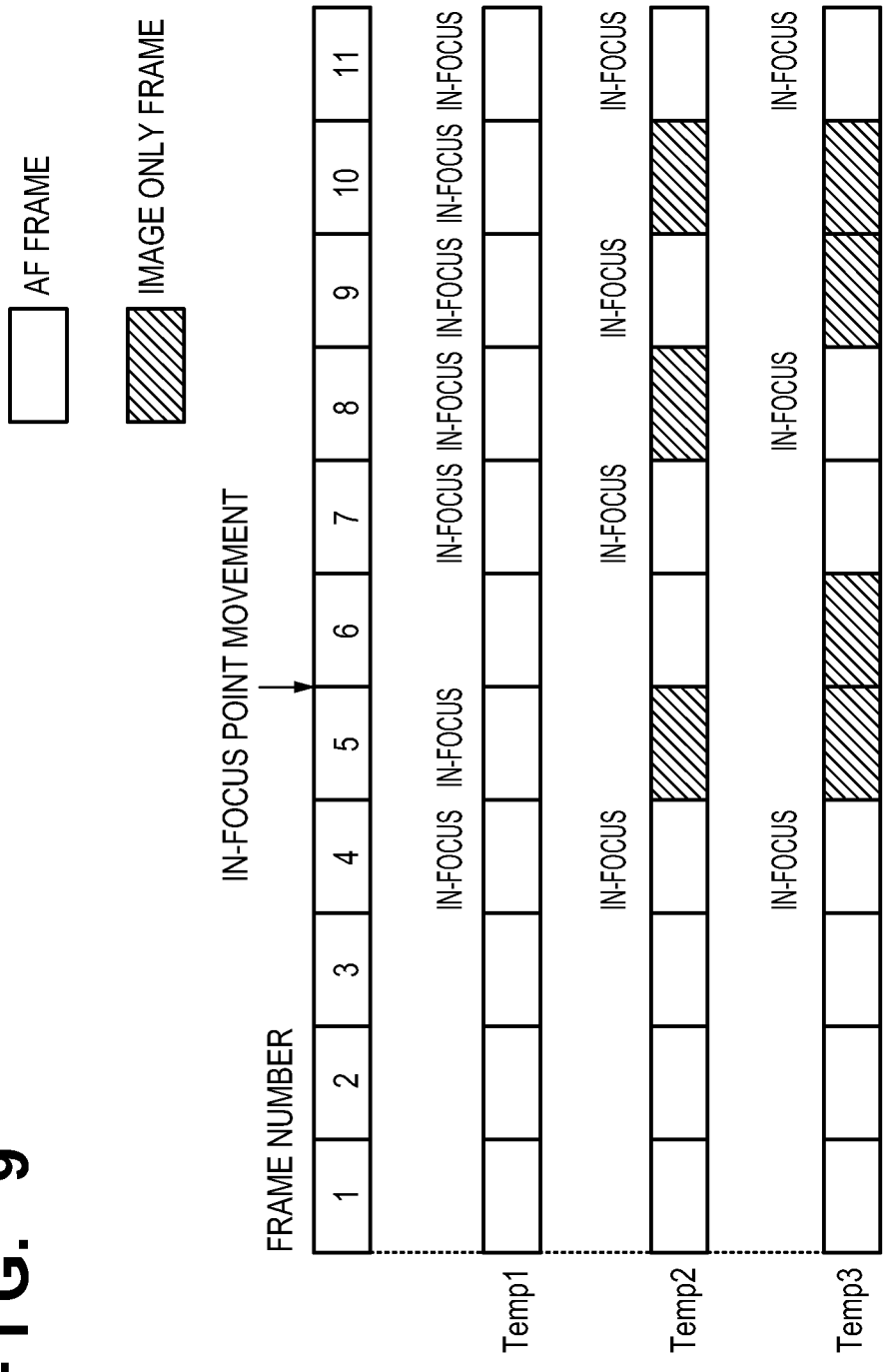
FIG. 9 is a timing chart for explaining control during moving image capturing according to the first embodiment.

Concerning the flowchart described with reference to FIG. 8, an example of readout frames at the time of moving image capturing will be explained next with reference to the timing chart of FIG. 9.

The frames are sequentially numbered starting at 1 from the start of moving image capturing. Control for each temperature when capturing the same object is illustrated. Temp1, Temp2, and Temp3 have a relationship given by Temp1<T1<Temp2<T2<Temp3. "In-focus point movement" between frame 5 and frame 6 indicates that the in-focus point has moved during this time because of movement of the object or the like.

When the temperature is Temp1, the frames are always read out as the AF frame. The phase difference calculation unit 109 performs phase difference calculation and determines whether an in-focus state is obtained. In the example shown in FIG. 9, out-of-focus is determined in the first three frames, and the phase difference calculation and focus adjustment are repetitively performed. In-focus is determined in the fourth and fifth frames. However, since the in-focus point moves after that, out-of-focus is determined in the sixth frame. In the sixth frame, the optical system driving unit 111 is controlled again based on the defocus amount obtained by the phase difference calculation unit 109, and focus adjustment is performed. Hence, an in-focus state is continuously obtained from the seventh frame.

When the temperature is Temp2, an in-focus state is obtained in the fourth frame. Hence, the next one frame is read out as the image only frame in accordance with steps S808 and S809. In the frame read out as the image only frame, the phase difference calculation cannot be performed, and it cannot be determined whether an in-focus state is obtained. However, this increases the number of frames read out as the image only frame for an object that moves little or an object that has a large depth of field and is therefore readily determined to be in an in-focus state. Since the power consumption of the entire system decreases, and the increase in the temperature is suppressed, the image capturing time can be prolonged.

When the temperature is Temp3, two frames next to a frame in which in-focus has been determined are read out as the image only frame, thereby further reducing the power consumption. After in-focus determination of the fourth frame, the next two frames are read out normally in accordance with steps S808 and S810. The AF frame is read out from the seventh frame again. After in-focus determination of the eighth frame, the next two frames are read out normally again.

As described above, when the temperature has risen, several frames after in-focus are read out as the image only frame, thereby prolonging the image capturing time while suppressing the degradation in AF tracking properties.

Second Embodiment

Figure 10:
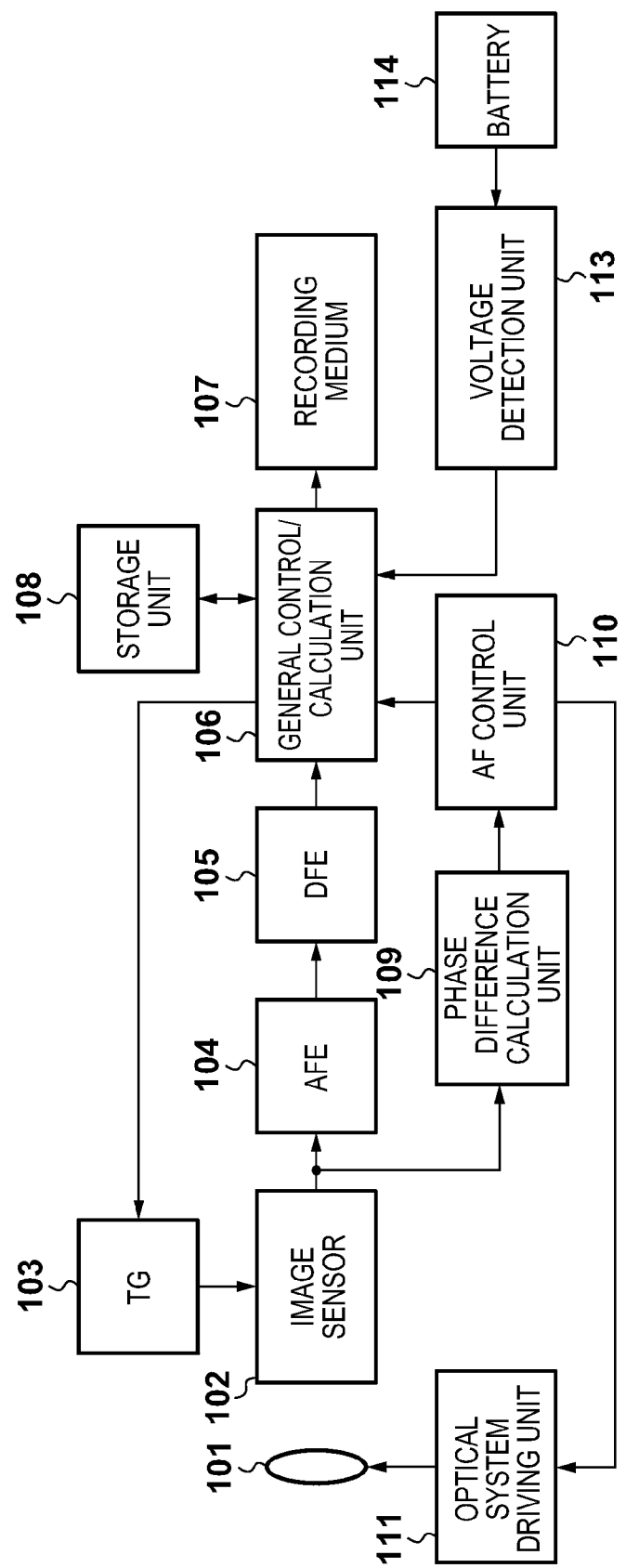
FIG. 10 is a block diagram of an image capture apparatus according to the second embodiment.

FIG. 10 is a block diagram showing the schematic arrangement of an image capture apparatus according to the second embodiment. As a characteristic feature of this embodiment, the image capture apparatus includes a voltage detection unit 113 for detecting the voltage of a battery 114, and the type of a frame to be acquired after in-focus is controlled based on the battery voltage, unlike the first embodiment. An example of readout frames at the time of moving image capturing according to this embodiment will be explained with reference to the timing chart of FIG. 11.

Figure 11:
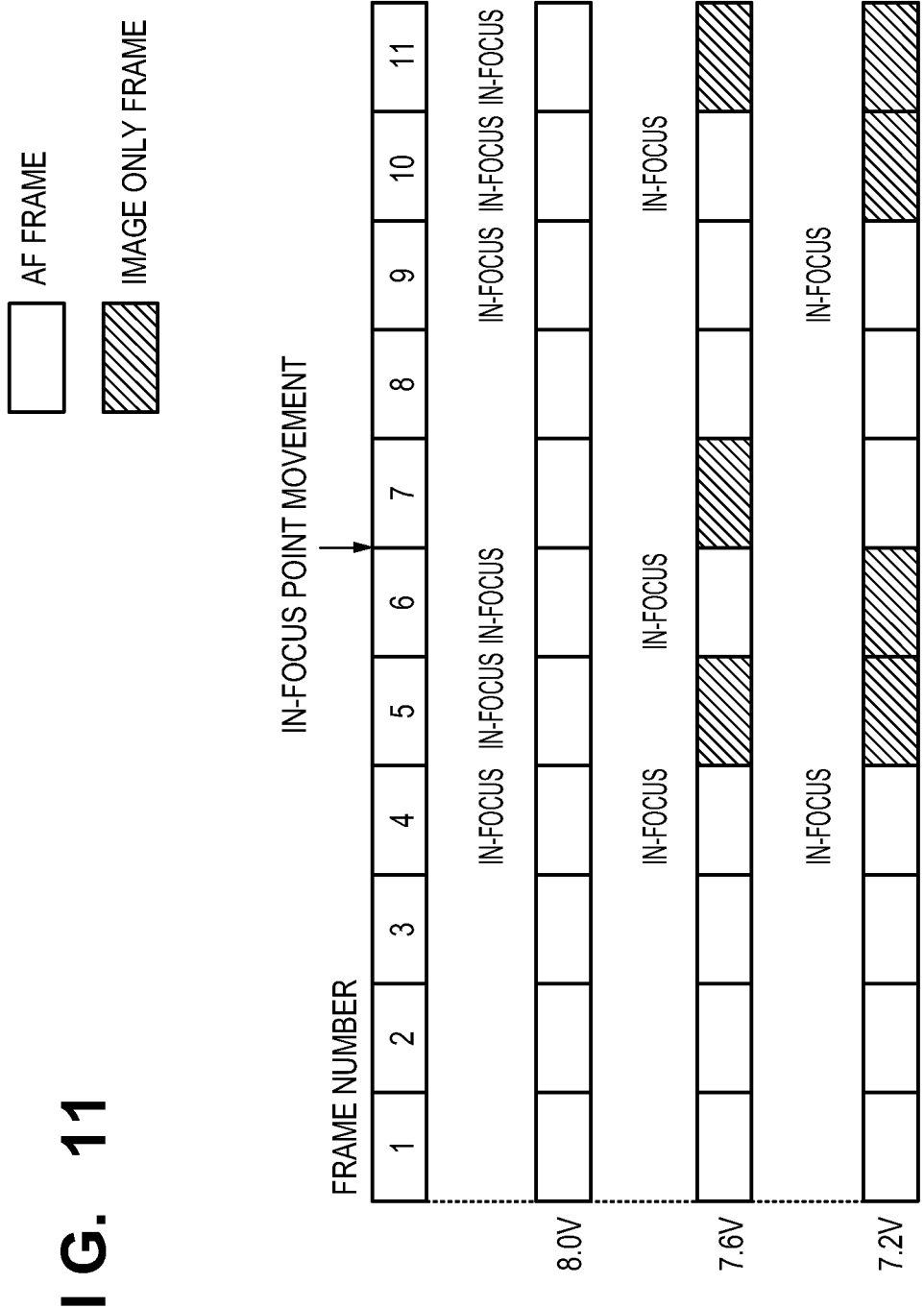
FIG. 11 is a timing chart for explaining control during moving image capturing according to the second embodiment.

FIG. 11 illustrates control for each battery voltage when capturing the same object, and assumes that the in-focus point of the object moves between frame 6 and frame 7.

When the battery voltage is 8.0 V, the frames are always read out as the AF frame. A phase difference calculation unit 109 performs phase difference calculation and determines whether an in-focus state is obtained. In the example shown in FIG. 11, out-of-focus is determined in the first three frames, and the phase difference calculation and focus adjustment are repetitively performed. In-focus is determined in the fourth to sixth frames. However, since the in-focus point moves after that, out-of-focus is determined in the seventh frame. In the seventh frame, an optical system driving unit 111 is controlled again based on the defocus amount obtained by the phase difference calculation unit 109, and focus adjustment is performed. Since the object image is not yet in the in-focus range even in the eighth frame, focus adjustment is performed again. An in-focus state is continuously obtained from the ninth frame.

When the battery voltage is 7.6 V, in-focus is determined in the fourth and ninth frames. The next one frame is read out as the image only frame.

When the battery voltage is 7.2 V, two frames next to a frame in which in-focus has been determined are read out as the image only frame, thereby further reducing the power consumption. It is therefore possible to prolong the image capturing time as much as possible even if the battery level is low.

As described above, when the battery voltage has decreased, several frames after in-focus are read out as the image only frame, thereby prolonging the image capturing time while suppressing the degradation in AF follow-up properties.

Preferred embodiments of the present invention have been described above. However, the present invention is not limited to these embodiments, and various changes and modifications can be made within the scope of the present invention.

An embodiment of the invention can provide an image capture apparatus comprising: an image sensor 102 having a pixel that photo-electrically converts an object image; readout means 203 configured to read out a signal for image forming and a signal for focus detection from the pixel; and control means 106 configured to control which one of a first readout mode to read out both the signal for focus detection and the signal for image forming from the pixel and a second readout mode to read out only the signal for image forming from the pixel is to be used to operate said readout means.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-193571, filed Sep. 3, 2012, which is hereby incorporated by reference herein in its entirety.

What is claimed is:

1. An image capture apparatus comprising:
an image sensor having a pixel unit which photo-electrically converts an object image;
a pixel signal readout unit configured to read out a signal for image forming and a signal for focus detection from the pixel unit;
a general control and calculating unit configured to control the readout unit to change a ratio of a number of frames in the first readout mode and a number of frames in the second readout mode, wherein a first readout mode is a mode comprising reading out both the signal for focus detection and the signal for image forming from the pixel unit and a second readout mode is a mode comprising reading out only the signal for image forming from the pixel unit-without reading out the signal for focus detection,
a phase difference calculation unit configured to determine based on the signal for focus detection whether the object image is in an in-focus state; and
a temperature detection unit configured to detect a temperature of the image capture apparatus,
wherein said general control and calculating unit is configured to control to read out the signal from the pixel unit in the second readout mode from a frame next to the frame in which the in-focus state has been determined by said determination unit, and to change the number of frames to read out the signal from the pixel unit in the second readout mode based on the temperature detected by said temperature detection unit, the general control and calculating unit further configured to increase the number of frames when the temperature detected by said temperature detection unit rises.

2. The apparatus according to claim 1, further comprising a voltage detection unit configured to detect a voltage of a battery of the image capture apparatus,
wherein said general control and calculating unit is configured to control to read out the signal from the pixel unit in the second readout mode from a frame next to the frame in which the in-focus state has been determined by said determination unit, and to change the number of frames to read out the signal from the pixel unit in the second readout mode based on the voltage detected by said voltage detection unit.

3. The apparatus according to claim 2, wherein said general control and calculating unit is configured to increase the number of frames as the voltage detected by said voltage detection unit decreases.

4. The apparatus according to claim 1, wherein the pixel unit has a micro-lens and a plurality of photoelectric conversion portion corresponding to the micro-lens.

5. The apparatus according to claim 4, wherein the signal for image forming is based on a signal in which the outputs of the plurality of photoelectric conversion portions are combined, and the signal for focus detection is based on a signal in which the outputs of the plurality of photoelectric conversion portions are not combined.

6. The apparatus according to claim 1, wherein said general control and calculating unit is configured to change the number of frames to read out to zero if the temperature is below a first predetermined temperature.

7. The apparatus according to claim 6, wherein said general control and calculating unit is configured to change the number of frames to read out to one if the temperature is greater than or equal to the first predetermined temperature and less than a second predetermined temperature.

8. The apparatus according to claim 7, wherein said general control and calculating unit is configured to change the number of frames to read out to two if the temperature is greater than or equal to the second predetermined temperature.

9. A method of an image capture apparatus, the apparatus comprising: an image sensor including a pixel unit which photo-electrically converts an object image; a pixel signal readout unit configured to read out a signal for image forming and a signal for focus detection from the pixel unit; and a control unit; the method comprising:
the general control and calculating unit controlling the pixel signal readout unit to change a ratio of a number of frames in the first readout mode and a number of frames in the second readout mode, wherein a first readout mode is a mode comprising reading out both the signal for focus detection and the signal for image forming from the pixel unit and a second readout mode is a mode comprising reading out only the signal for image forming from the pixel unit without reading out the signal for focus detection, determining based on the signal for focus detection whether the object image is in an in-focus state, wherein said general control and calculating unit controls to read out, in the second readout mode, at least one frame next to a frame in which the in-focus state has been determined in said determining step, detecting a temperature of the image capture apparatus, wherein said general control and calculating unit controls to read out the signal from the pixel unit in the second readout mode from a frame next to the frame in which the in-focus state has been determined, and changes the number of frames to read out the signal from the pixel unit in the second readout mode based on the temperature detected in said temperature detecting step, wherein said general control and calculating unit increases the number of frames as the temperature detected in said temperature detecting step rises.

10. The method according to claim 9, wherein said control unit increases the number of frames as the temperature detected in said temperature detecting step rises.

11. The method according to claim 9, further comprising detecting a voltage of a battery of the image capture apparatus, wherein said general control and calculating unit controls to read out the signal from the pixel unit in the second readout mode from a frame next to the frame in which the in-focus state has been determined, and changes the number of frames to read out the signal from the pixel unit in the second readout mode based on the voltage detected in said voltage detecting step.

12. The method according to claim 11, wherein said control unit increases the number of frames as the voltage detected in said voltage detecting step decreases.

13. The method according to claim 9, wherein said general control and calculating unit is configured to change the number of frames to read out to zero if the temperature is below a first predetermined temperature.

14. The method according to claim 13, wherein said general control and calculating unit is configured to change the number of frames to read out to one if the temperature is greater than or equal to the first predetermined temperature and less than a second predetermined temperature.

15. The method according to claim 14, wherein said general control and calculating unit is configured to change the number of frames to read out to two if the temperature is greater than or equal to the second predetermined temperature.

16. A non-transitory computer-readable storage medium storing a program to cause a computer to perform a method of an image capture apparatus, the apparatus comprising: an image sensor including a pixel unit which photo-electrically converts an object image; a pixel signal readout unit configured to read out a signal for image forming and a signal for focus detection from the pixel unit; and a general control and calculating unit; the method comprising:

the general control and calculating unit controlling the pixel signal readout unit to change a ratio of a number of frames in the first readout mode and a number of frames in the second readout mode, wherein a first readout mode is a mode comprising reading out both the signal for focus detection and the signal for image forming from the pixel unit and a second readout mode is a mode comprising reading out only the signal for image forming from the pixel unit without reading out the signal for focus detection, determining based on the signal for focus detection whether the object image is in an in-focus state, wherein said general control and calculating unit controls to read out, in the second readout mode, at least one frame next to a frame in which the in-focus state has been determined in said determining step, detecting a temperature of the image capture apparatus, wherein said general control and calculating unit controls to read out the signal from the pixel unit in the second readout mode from a frame next to the frame in which the in-focus state has been determined, and changes the number of frames to read out the signal from the pixel unit in the second readout mode based on the temperature detected in said temperature detecting step, wherein said general control and calculating unit increases the number of frames as the temperature detected in said temperature detecting step rises.

\* \* \* \* \*